United States Patent
Edwards et al.

(10) Patent No.: US 6,490,626 B1
(45) Date of Patent: Dec. 3, 2002

(54) BROWSER SYSTEM

(75) Inventors: Nigel Edwards, Bristol (GB); Owen Rees, Newport (GB); Qun Zhong, San Jose, CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/193,389

(22) Filed: Nov. 17, 1998

(30) Foreign Application Priority Data

Nov. 19, 1997 (EP) .............................................. 97309328

(51) Int. Cl.$^7$ .............................................. G06F 13/00
(52) U.S. Cl. ........................................ 709/229; 709/218
(58) Field of Search ................................ 709/218, 229, 709/223, 219

(56) References Cited

U.S. PATENT DOCUMENTS

| | | | | |
|---|---|---|---|---|
| 5,903,732 A | * | 5/1999 | Reed et al. ..................... | 380/49 |
| 5,940,831 A | * | 8/1999 | Takano ......................... | 707/10 |
| 5,991,796 A | * | 11/1999 | Anupam et al. ............. | 709/206 |
| 6,112,238 A | * | 8/2000 | Boyd et al. .................. | 709/224 |
| 6,122,648 A | * | 9/2000 | Roderick ..................... | 707/513 |
| 6,134,592 A | * | 10/2000 | Montulli ...................... | 709/229 |

OTHER PUBLICATIONS

S. Wallach, et al., "Extensible Security Architectures for Java", *16th ACM Symposium on Operating Systems Principles*, vol. 31, No. 1 5, Oct. 1997.

F. Rouaix, "A Web navigator with applets in Cam1", *Computer Networks and ISDN Systems*, vol. 11, No. 28, May 1996.

J. Gosling, et al., "The Java Language Environment: A White Paper", *Sun Delivers Java Workshop*, Oct. 1995.

* cited by examiner

*Primary Examiner*—David Wiley
(74) *Attorney, Agent, or Firm*—Ladas & Parry

(57) ABSTRACT

A Web browser (210) is configured to run in a middle compartment (206) of a Compartmented Mode Workstation (CMW) (200). The operation of the Web browser (210) is prevented from accessing or damaging other compartments of the CMW machine (200) as a result of mandatory access control (MAC), which is configured appropriately.

The Web browser (210) communicates with Web servers (252) attached to the internet (240), the Internet being connected to an outside compartment of the CMW machine (210), via a trusted outside process (TPO) (214). TPO (214) has the privileges required to override MAC. The Web browser (210) communicates with a display server (232), which is attached to an inside compartment (204) of the CMW machine (210), via a trusted inside process (TPI) (204). TPI also has privileges to override MAC. The Web browser (210) can request and receive Web pages incorporating mobile code, and can process the mobile code safely within the middle compartment (206). As a result of processing the mobile code, the Web browser (210) sends only X-messages to the display server (232), in order that the display server can render the images resulting from the processed mobile code.

21 Claims, 6 Drawing Sheets

BROWSER SYSTEM

TECHNICAL FIELD

The present invention relates in general to computerised systems for down-loading, or 'browsing', information stored in computer-readable form. More particularly, although not exclusively, the invention relates to a browser system for browsing information that contains mobile code retrievable from the World Wide Web.

BACKGROUND ART

The World Wide Web (Web) may be thought of as a global village where computers (hosts) are the buildings, and the worldwide computer network known as the Internet forms the streets. The computers have addresses (IP Addresses) consisting of four numbers separated by periods. Many hosts also have nicknames known as domain names. A Web site typically consists of a UNIX or Microsoft Windows based Web server, which runs on a host and 'serves' software or content to other computers accessing the Web site. A Web site is not a single application, but a system that provides access to applications and data stored on the host, as well as inside an organisation. A user utilises a Web 'browser' running on a client computer to access the software or content on the Web server.

FIG. 1 illustrates a client computer 100 executing a Web browser program 105 that is employed by a user to communicate over the Internet 110, in a special language called HyperText Transfer Protocol (HTTP) 115, with a host computer 120 executing a Web server program 125 to obtain data. Hereafter, the term 'Web browser' may be used interchangeably to describe a Web browser program or the program in execution on a computer, depending on the context. In the diagram, and in following diagrams, solid connection lines represent physical connections between hardware and broken connection lines represent logical connections between software processes. The most basic Web transaction involves the transmission of Web pages, written in HyperText Markup Language (HTML) from the Web server 125 to the Web browser 105. Upon request by the user at the Web browser 105, the Web server 125 translates the HTML-based Web page into HTTP and sends it over the Internet 110 for display as a Web page on the requesting browser 105. The Web browser 105 receives the HTTP-encoded Web page, translates the HTTP back into HTML and displays the page.

The concept of 'mobile code' has been developed to extend the functionality of the Web. Mobile code is typically code associated with a Web page which, when downloaded from a Web server, automatically executes within the environment of the requesting Web browser. In a simple form, mobile code can be used to enhance the graphical appearance of a Web page by, for example, implementing simple animation. It is envisaged, however, that mobile code will be used to implement many different and far more complex functions in future. A good example of one use for mobile code is to download transactional clients, which support specialised user interfaces, to support data transfer between client and server applications.

Commonly, mobile code is written in the Java programming language as a Java applet. Mobile code may also be written in other languages, such as defined in the ActiveX model. Both Java applets and ActiveX control functions can be embedded into a standard Web page. Therefore, the simple operation of downloading a Web page can also download and activate associated mobile code.

While mobile code can greatly extend the functionality of the Web, the same extended functionality, by its nature, leads to serious security issues.

Mobile code, and Web browsers that run mobile code, are developed according to rigid security guidelines which are intended to prevent the possibility that malicious users can use mobile code to cause harm to the computing environment surrounding a Web browser. However, there are already many documented flaws in the security measures, which can lead to devastating results. Typically, the party downloading 'rogue' mobile code would be unaware of the damaging effect thereof until it was too late.

Some serious mobile code attacks known take advantage of bugs in the mobile code processing environment of the Web browser, which allow the mobile code to gain control over the operating system of the computing platform. From this position, the mobile code could cause damage such as deleting all files on the computer, or even launching attacks on other, networked computing platforms.

Other serious mobile code attacks are known as 'social engineering' attacks. These attacks rely on tricking an unwary user by, for example, sending the user a 'patch' for the Web browser, and suggesting that the patch is to remedy a security flaw in the Web browser. The patch, instead of being one that remedies a security flaw, actually overwrites good code with code that creates a security flaw. There are many other ways of tricking unwary users in this way.

Web browsers, which can run mobile code, such as Netscape Navigator™, typically include the option to 'disable' mobile code processing, thereby preventing the potential for any damage, even if mobile code is downloaded. Of course, this radical measure, whilst being very effective, also removes any benefit which can be obtained from genuine, safe mobile code.

It would therefore be desirable to have a system in which mobile code can be executed safely, while at the same time not allowing rogue mobile code to cause any damage to any system.

DISCLOSURE OF THE INVENTION

In accordance with a first aspect, the present invention provides a browser system, comprising a browser process configured to receive from a remote data source a resource incorporating mobile code and to process the mobile code to generate graphical output data; and an interface process configured to provide a communications channel between the browser process and a remote display system to facilitate transfer of the graphical output data to the remote display system.

The term browser is commonly associated with complex and sophisticated programs such as Netscape Navigator™ or Internet Explorer™. These programs are well known. However, herein, the term browser is used more broadly to include any program or system which, when running, is able to receive a requested resource, for example a Web page, from a source such as a Web server connected via a communications network to the browser. Further, a browser according to the present invention can even receive unsolicited resources as a result of, for example, some form of 'push' technology, which distributes resources or messages to registered subscribers.

The invention has the advantage that mobile code is processed in a secure environment, so that the client, which is apart from the environment, remains relatively safe from attack. The client only receives data from the browser to visualise the output of the processing of the mobile code on the browser. The client is, therefore, in effect able to access mobile code, and see the result of the processing of the mobile code, without being subjected to any threat from rogue mobile code.

In a preferred embodiment of the present invention, the browser system comprises a secure operating system, for example one which enforces Mandatory Access Control (MAC), such that mobile code and the browser are unable to damage the system running the browser, let alone the client.

While the invention, in general, aims to protect user systems from rogue mobile code, and from vulnerable browsers running rogue mobile code, embodiments which employ secure operating systems, such as those providing MAC, can be configured to also provide a high level of protection to the computer platform that supports the browser running the mobile code. Such systems consequently can provide even more protection to users' systems, by greatly reducing the risk of mobile code reaching users' systems, or other parts of the network, by some other route.

Other aspects and features of the invention are described and claimed hereafter.

BRIEF DESCRIPTION OF THE DRAWINGS

A preferred embodiment of the present invention will now be described, by way of example only, with reference to the accompanying drawings, of which.

BEST MODE FOR CARRYING OUT THE INVENTION, & INDUSTRIAL APPLICABILITY

According to the present embodiment, the Web browser operates on a computing platform within the environment of a secure operating system that enforces MAC. A particularly suitable secure operating system is the HP-UX 10.09.01 Compartmented Mode Workstation (CMW) sold by Hewlett-Packard Company, which provides a MAC policy governing the way data may be accessed on a trusted system.

The MAC policy is a computerised version of the US Department of Defence's long-standing multilevel security policy for handling classified information. The MAC policy uses labels that reflect information sensitivity, and maintains those labels for every process and file system object to prevent users not cleared for certain levels of classified information from accessing it. Under MAC, users and processes are also assigned clearances. A clearance defines the maximum sensitivity label the user or process can access, which is necessary since some users and processes have privileges that allow them to switch between sensitivity labels. Using the MAC policy, the operating system controls access based on the relative sensitivity of the applications running and the files they access. The HP-UX CMW operating system rates as a B1 grade secure operating system, according to the Orange Book [NCSC] criteria. In general B1 and higher-grade operating systems apply some form of MAC.

The HP-UX 10.09.01 CMW [DIA 91], is described in detail in the documents referenced at the end of this description, which are available from Hewlett-Packard Company. At the time of writing this description, HP-UX 10.09.01 CMW is the current version of the operating system. Future versions of the operating system, and the respective documentation, will, however, remain relevant to the present description and embodiment.

Hereinafter, for convenience of description only, the term "CMW machine" is intended to mean a computing platform with an operating system having additional, CMW security features, which are described below. A particularly suitable operating system is Hewlett-Packard Company's HP-UX CMW operating system.

The following description describes in detail how to use Mandatory and Discretionary Access Controls, Sensitivity Labels, Trusted Processes and Privileges on a CMW machine to restrict the behaviour of mobile code and of a Web browser that downloads this code. A preferred arrangement is shown in FIG. 2.

Figure 1:
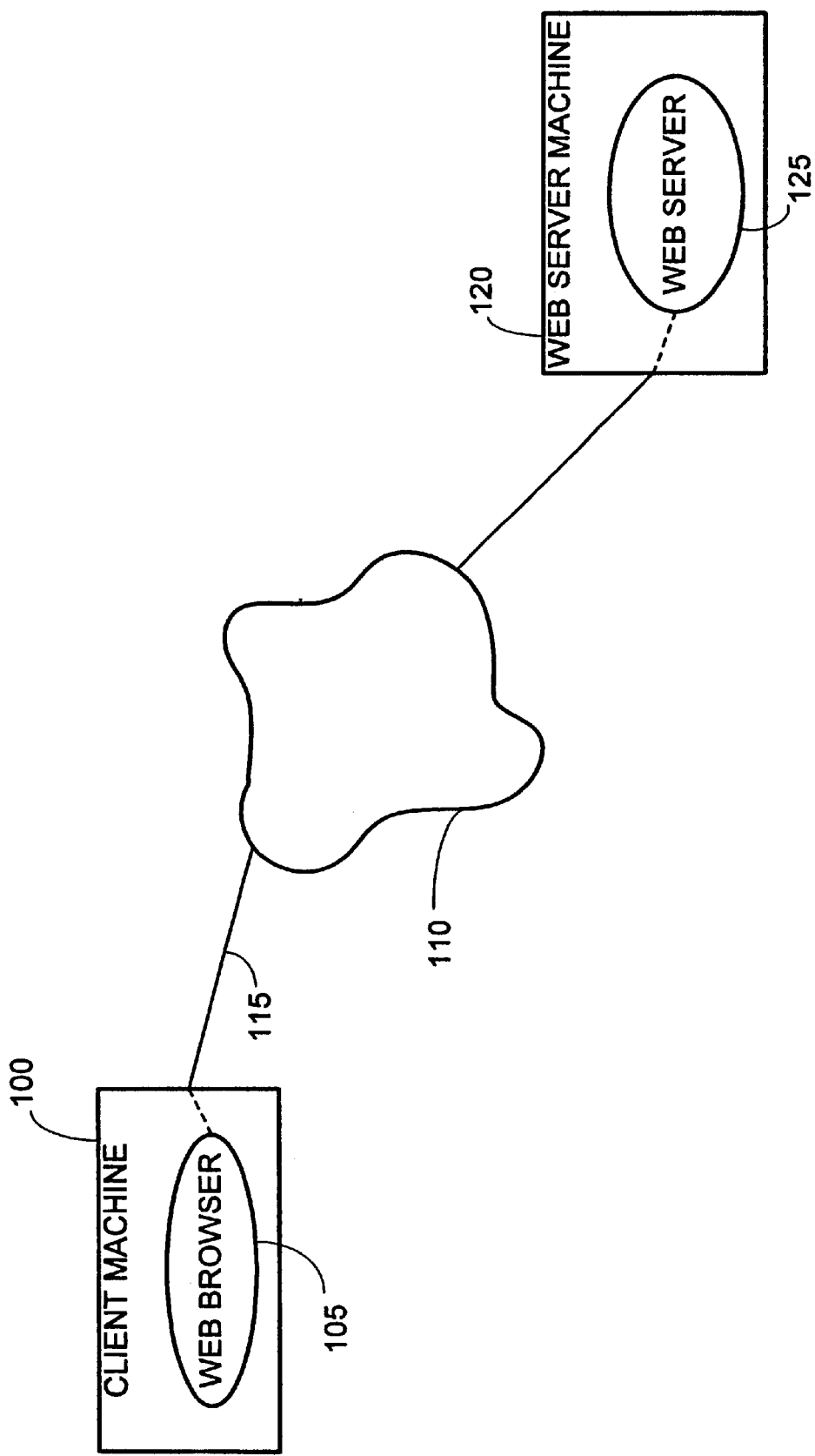
FIG. 1 is a diagram illustrating a standard Web environment.
Figure 2:
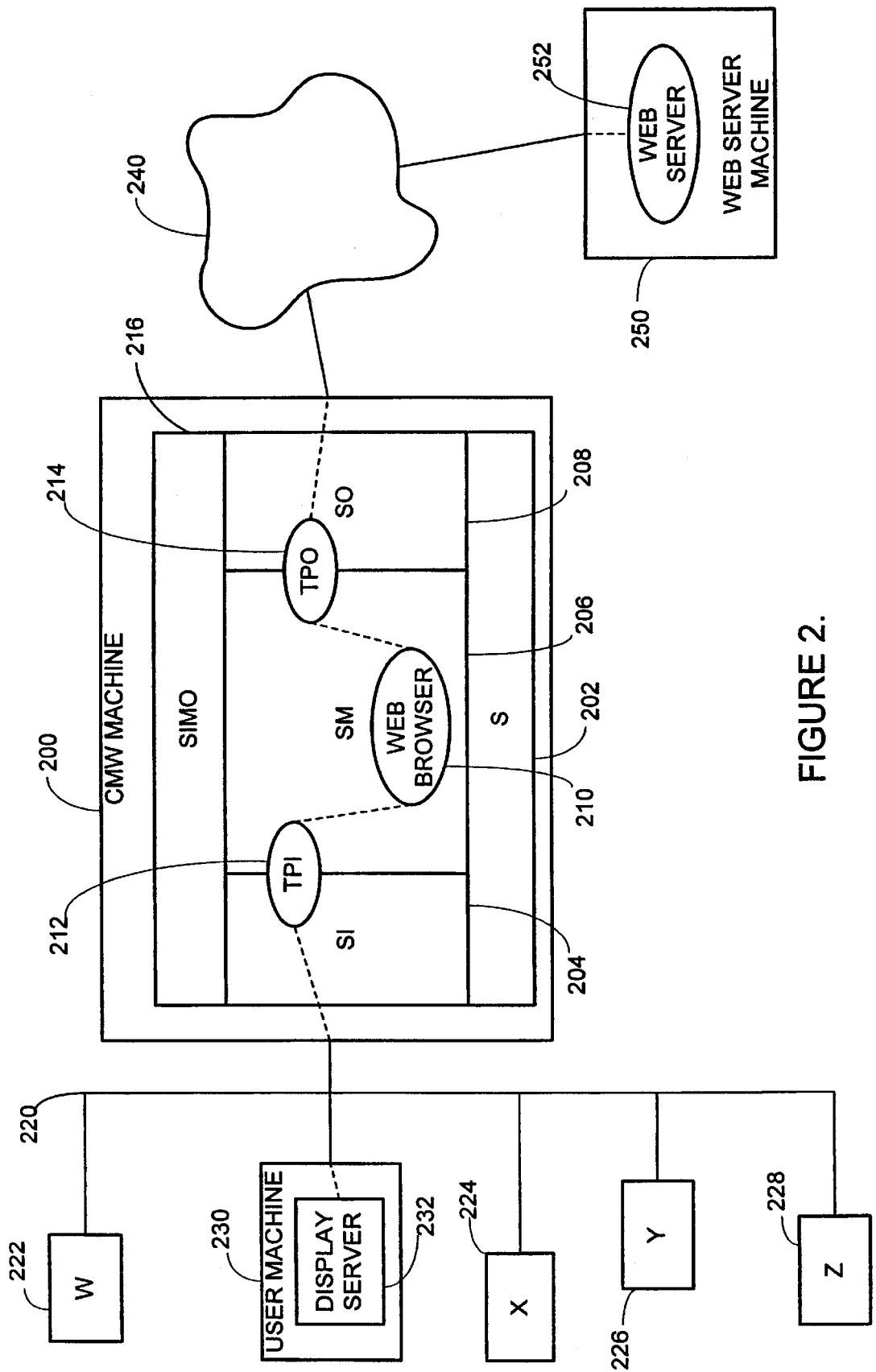
FIG. 2 is a diagram illustrating a CMW machine configured for operation in accordance with the present embodiment.

FIG. 2 illustrates a CMW machine 200 connected via an internal network 220 to a user machine 230 running a display server 232, and via an external network to a Web server 252 machine 250 running a Web server 252. The internal network 220 is also shown connected to other apparatus, labelled w, x, y and z (labelled 222, 224, 226 and 228 respectively), which can be other user machines, servers or network appliances such as printers. The external network comprises a connection from the CMW machine 200 to the Internet 240 (via appropriate switching and routing equipment, which is not shown). The user machine 230 can be, for example, a PC, a UNIX workstation or an X terminal. For the present purposes, the user machine 230, in whatever form, is running an X display server 232. The internal network 220 comprises an Ethernet, which supports TCP/IP communications between the user machine 230 and the CMW machine 200.

The CMW machine 200 is configured to have one classification: System (S) 202; and three compartments: Inside (I) 204, Middle (M) 206 and Outside (O) 208. This generates eight sensitivity labels (the operation of which will be described in detail below) of which only five are used in FIG. 2: S, SI, SM, SO, SIMO (shown as 216). The three other possible sensitivity labels—SIO, SIM, and SMO—are unused in this embodiment. The CMW machine 200 incorporates a Web browser 210, which is arranged to run in the SM compartment. The Web browser 210 in this case is a Netscape Navigator™ browser. A compartment is, in effect, a virtual machine within which processes and file objects associated with the virtual machine can operate or be operated on.

The display server 232 is attached to the SI compartment of the CMW machine 200, and the external network is attached to the SO compartment of the CMW machine 200. Thus, data received from, or transmitted onto, the external network acquires the sensitivity label of the SO compartment. Also, data sent to or received from the display server 232 acquires the sensitivity label of the SI compartment.

As already mentioned, sensitivity labels are associated with every process and file system object, and are used as the primary basis for all MAC policy decisions. A sensitivity label represents the sensitivity of a process or a file system object and also the data each contains. If an application and the file it attempts to access have compatible sensitivity labels, the application can read, write, or possibly execute the file, and each new process typically inherits the sensitivity label of its parent. For example, if a program is executed within a shell (for example, sh(1), csh(1), or ksh(1)), the new process automatically inherits the sensitivity label of the shell process. New files always inherit the sensitivity label of the process that creates them. The system can provide special trusted programs that may be employed for changing the sensitivity label of a file after it has been created.

Sensitivity labels are prioritised for MAC in a way that determines how processes or objects having one sensitivity label can interact with processes or objects having different sensitivity labels. The prioritisation is defined internally of the operating system. The diagram in FIG. 3 represents the relationship between the parts of the system illustrated in FIG. 2.

Figure 3:
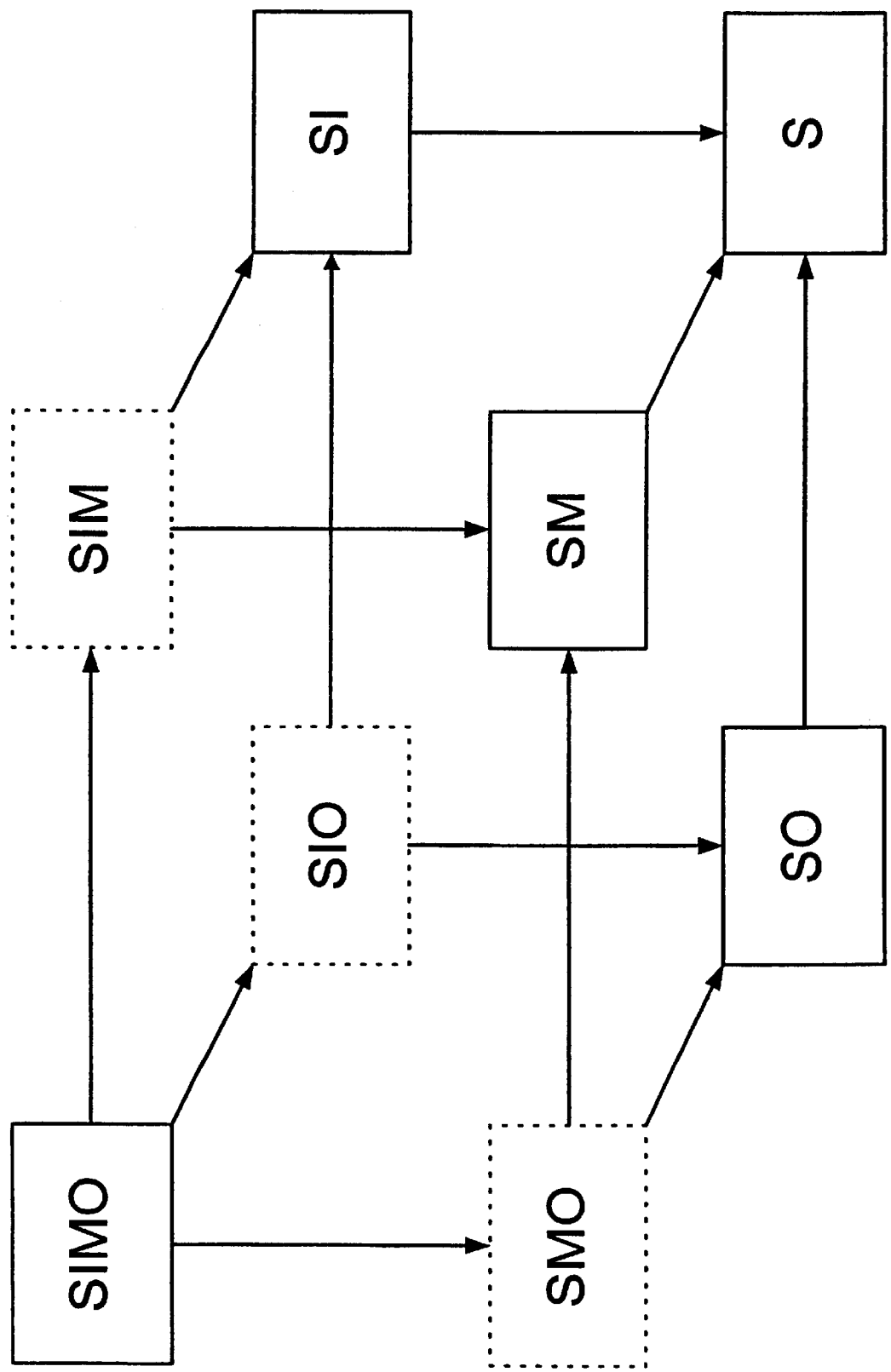
FIG. 3 is a diagram, which illustrates the 'dominates' relationships between compartments defined in the CMW machine of FIG. 2.

In FIG. 3, the arrows point from dominating sensitivity labels to dominated sensitivity labels. Thus, in FIG. 3: SIMO dominates SI, SM and SO; SO dominates S; SM dominates S; and SI dominates S. It should be noted that SO, SM and SI have no 'dominates' relationships between them. Also, the labels SMO, SIO and SIM, which are not used in the present embodiment, are illustrated for completeness in boxes with dashed lines to indicate where they would appear. One further important aspect of the dominates relationships, which is not shown in the diagram, is that each sensitivity label dominates itself.

Users are generally not permitted to downgrade (by reducing the respective sensitivity labels of) any files, processes or objects which they control, so that the new label is dominated by the previous label. Also, users are not permitted to cross grade them so that the new label is incomparable to the previous one. The system is also configured so that downgrading and cross grading are not enacted automatically by the acts of reading or writing.

The effect of the MAC policy is to rigidly control information flow in the system, from process to file to process, to prevent accidental or intentional mislabelling of sensitive information. To achieve this, for every operation, the system compares sensitivity labels to determine if a user or process can access an object. Any time a user or process tries to read, write, or execute a file, the system examines the process and object sensitivity labels and consults its MAC rules. For each operation a process requests the system determines if the process has mandatory read or mandatory write access to the object. Most restrictions that the MAC policy enforces can be summarised by the two following rules:

(1) Mandatory read access: a process can read or execute a file, search a directory, or (subject to other privilege requirements) read the contents of other objects if the process's sensitivity label dominates the object's. All of these operations involve transferring data from the object to the process, so having such access is referred to as "mandatory read" access.

(2) Mandatory write access: a process can write to a file, remove or create an entry in a directory, or change any object's security attributes (including its sensitivity label), if the process's sensitivity label is the same as the object's. All of these actions involve transferring data from the process to the object, so having such access is called "mandatory write" access.

The first rule prevents a user who is not cleared for classified information from seeing it. The second rule prevents a user with a high clearance from revealing information to other users with lower clearances.

In effect, MAC in the CMW machine 200 ensures that information can flow only in the opposite direction to the "dominates" relationship. Thus MAC allows the mobile code and Web browser 210 to read data only with a sensitivity label of "S" or "SM". The Web browser 210 and mobile code can write data only with a sensitivity label of "SM". Neither the Web browser 210, nor the mobile code, is able to gain direct access to either the inside network or the outside network, since these have sensitivity labels of "SI" and "SO".

The CMW machine 200 does not impose the concept of an all-powerful "Super User" (e.g. "root") or Administrator. Instead, this power is divided up into a number of privileges. Assigning privileges to a program confers on it power to do particular actions. Programs with these privileges are known as 'trusted processes'. Trusted processes, TPI (trusted process—inside) 212 and TPO (trusted process—outside) 214, shown in FIG. 2, have the privileges that allow them to override the MAC. Thus the Web browser 210 and mobile code must use TPI 212 and TPO 214 to gain access to the internal and external networks.

Trusted processes are typically very small programs, which are carefully designed to carry out a single, specific process, such as passing specific data between compartments in a CMW machine. Trusted processes have privileges which enable them to override MAC, but these privileges are only raised when required, and lowered thereafter, to minimise the chances of misuse by any other user or process. Also, a trusted process checks whether a user or other process has the right to access it, before allowing such access.

TPI 212 is a trusted process that manages the interaction between the real Web browser 210 (and mobile code) running in the SM compartment, and the display server 232 running on the inside network. In some embodiments, the display server 232 could in fact be running in the SI compartment on the CMW machine 200, but this would be less likely in a networked environment. TPI 212 has the necessary privileges that enable it to override MAC and pass data between the SI and SM compartments.

In broad terms, the fundamental function of the TPI 212 is to provide a non-by-passable control point for display messages directed to the internal network. This category of function is sometimes known as a reference monitor, but the Applicants are not aware of a reference monitor of any type used as specified herein.

TPO 214 is a trusted process, which manages interaction between the real Web browser 210 (and mobile code) running in the SM compartment, and the Internet 240, which is connected to the SO compartment.

All messages from the Web browser 210 (and mobile code) to the external network are sent via TPO 214. TPO 214 can be configured to block undesirable messages from the Web browser 210, such as attempts to communicate with prohibited external sites or attempts to download mobile code from certain sites. Additionally, TPO 214 can be configured to block messages emanating from the downloaded code when it executes in the Web browser 210. TPO 214 can also be configured to filter incoming messages intended for the Web browser 210, in a similar fashion to a packet filter or firewall. The Web browser 210 runs in the SM compartment without any privileges. The Web browser 210 is configured to direct every network connection to TPO 214 by making use of built-in SOCKS functionality. That is to say, the Web browser 210 must support SOCKS, as will be described below.

The Web browser 210's executable file, the files, directories and the resources that are only read by the Web browser 210, such as the configuration files, are given the label S. The result is that the MAC protects these resources so that users, a broken browser or malicious mobile code cannot bypass the security administration by overwriting them with their own copies of these files. Other files that need to be both read and written to by the Web browser 210, such as a bookmark file, history files or a cache, are labelled as SM.

All the users and hosts of the internal network 220 are given the label SI and all the hosts of the Internet 240 are given the label SO. Since the Web browser 210 has no privileges, it and all its child processes, such as those executing mobile code, can only run with the label SM. Therefore, the behaviour of the Web browser 210 and mobile code is encapsulated in the SM compartment.

Thus, the CMW machine 200 configuration shown in FIG. 2 ensures that the Web browser 210 running in the SM compartment cannot interfere with other processes running with other sensitivity labels. This configuration can be generalised to an arbitrary number of middle compartments (Middle_1, ..., Middle_n). Each compartment can be used to isolate a Web browser 210 and any associated mobile code accessed by a user connected to the CMW machine 200. If some controlled sharing of information between the code in the Web browsers is required, multiple browsers can run in the same compartments, under different user identifiers. The CMW machine 200 therefore acts as a Web browser 210 server to let multiple users on the inside network use Web browsers 210 and mobile code securely and conveniently. Each user has a personal copy of his or her Web browser 210 resources, such as a bookmark file, on the CMW machine 200, with these resources all having the same sensitivity label. Conventional Discretionary Access Control (DAC), as found in general operating systems such as UNIX, can be used to specify which local files owned by one user the mobile code downloaded by another user can access.

Figure 4:
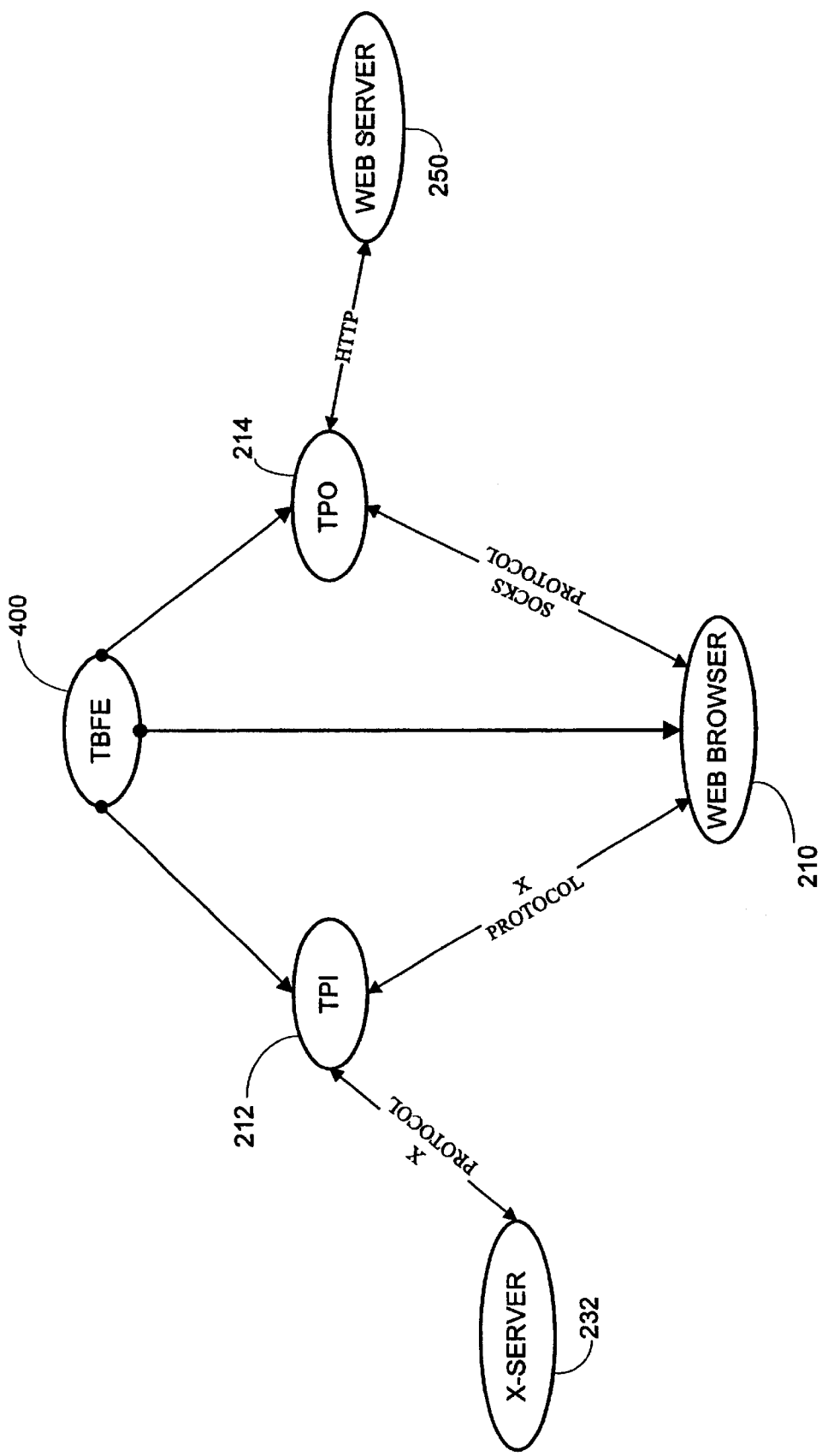
FIG. 4 is a diagram, which illustrates the relationships, and protocols that exist between the processes that operate for the purposes of the present embodiment.

The implementation of the above architecture consists of the four components, three of which have been described above, namely: TPI 212, TPO 214 and the Web browser 210. These three components, and a fourth component, the trusted browser front end (TBFE), are illustrated in FIG. 4. FIG. 4 shows the relationship between these four components and the communication protocols in use between them.

The diagram in FIG. 4 shows that the TBFE is a parent process to TPI 212, TPO 214 and the Web browser 210. In other words, TPI 212, TPO 214 and the Web browser 210 are child process to the TBFE. Communications between TPI 212 and the Web browser 210 comprise X-messages, communications between the Web browser 210 and TPO 214 comprise SOCKS messages and the communications between TPI 212 and the display server 232 comprise X-messages.

The following six privileges are defined within CMW and are used in accordance with the present embodiment to support the present system:

Allowmacread: overrides MAC restrictions on read operations, allowing a process having this privilege to read an object's data and attributes regardless of the object's sensitivity label;

Allowmacwrite: overrides MAC restrictions on write operations, allowing a process having this privilege to write an object's data and attributes regardless of the object's sensitivity label;

Chsubjsl: (stands for change subject sensitivity label) allows a process having this privilege to change its own sensitivity label to any label dominated by the process's clearance;

Configaudit: required by the ioctl(2) interface and used to configure the security audit system;

Suspendaudit: if raised, the security audit system does not produce system call records on behalf of the processes. Most trusted processes raise this privilege because they produce their own audit records, making those automatically generated by system calls unnecessary; and Writeaudit: Required by the write(2) interface of the audit device to append records to the audit trail.

TPI 212 comprises a proxy display server (in this embodiment, a proxy X-server [X Window]). The Web browser 210 in effect sends all X requests needed to render itself on a screen to TPI 212, rather than to a local display server. Subsequently, TPI 212 forwards the requests to the remote display server 232 running on the user machine 230. TPI 212 can also be configured to filter out undesirable or dangerous messages before forwarding them to the remote display server 232 on the internal network 220. For example, TPI 212 may be configured to connect only to a predefined set of hosts or clients, and only to the display servers on those hosts. The details of such a configuration are beyond the scope of the present description, but are within the limits of ability of the skilled person.

For operation in accordance with the present embodiment, TPI 212 requires the Chsubjsl privilege to allow it to receive connections from both the SI and SM compartments. TPI 212 also requires the Allowmacread and Allowmacwrite privileges, so that it can pass data between the SM and SI compartments. TPI 212 also needs Configaudit, Suspendaudit and Writeaudit privileges to configure, manipulate and write audit records, as mentioned above.

TPO 214 comprises a connection request proxy, which in the present embodiment is a modified SOCKS server that uses the SOCKS [SOCKS] protocol to communicate with the Web browser 210, and mobile code downloaded by the Web browser 210, in the SM compartment. SOCKS is a well known, freeware proxy server, used to relay TCP streams between a client and the Internet 240. It is known to configure and use SOCKS as a filter or firewall application.

SOCKS is modified in TPO 214 in the present embodiment so that it can accept connections originating from multiple sensitivity labels. That is, TPO 214 can accept connections from the SM compartment, as well as from the SO compartment. This is achieved, as with TPI 212, using the Chsubjsl privilege. TPO 214 can also pass the data between compartments having different sensitivity labels using the Allowmacread and Allowmacwrite privileges subject to the security criteria set up by the system's security administrator.

TPO 214 also needs Configaudit, Suspendaudit, and Writeaudit to configure, manipulate and write audit records.

Figure 5:
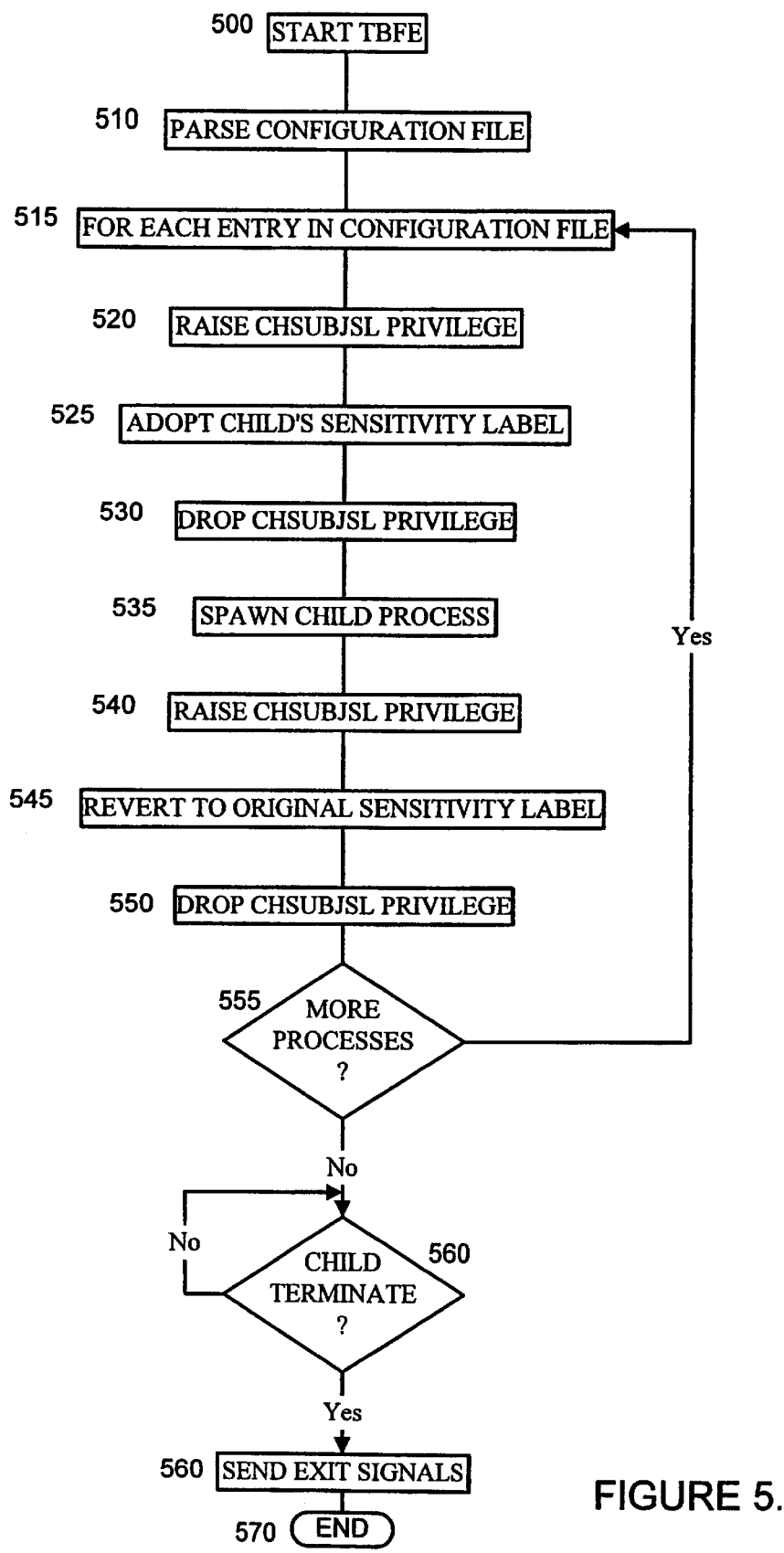
FIG. 5 is a flow diagram which illustrates the steps required to initiate a CMW machine for operation in accordance with the present embodiment.

The process for initialising a Web browser 210 and its associated proxies will now be described with reference to the flow diagram in FIG. 5.

In step 500, a TBFE is started remotely by the user, who has an account on the CMW machine 200, which authorises the user to activate a Web browser 210. The user can start TBFE by making use of remote execution functions provided by UNIX, such as 'remsh' or 'rexec'. To do this, the user would first have to be logged-on to the CMW machine
200. The server version of these functions can be rewritten
to take the advantage of the CMW machine 200 to enhance
security, but a description of how to achieve this is outside
the scope of this text. A shell script to start the TBFE on the
CMW machine 200 is installed on the user's machine. An
alternative to a shell script would be to use Secure Shell
(SSH) to provide a secure login. Conveniently, SSH also
encrypts the X-protocol messages, by using the SSH server
(on the CMW machine 200 ) to pass the X-messages to the
SSH client (on the user's machine). The SSH client then
forwards the X-messages to the X-server running on the
user's machine.

In step 510, when TBFE is started, it reads and parses its
configuration file to check for semantic errors. An exemplary configuration file is reproduced below:

```
# lines start with # are comments

# start tpi at system inside and let it talk with system middle
BEGIN_INIT{
#location of the program
PROGRAM: /home/proj1/tpi
#sensitivity label to start the program
LEVEL: SYSTEM INSIDE
#arguments passed to the program
ARG: -1 "SYSTEM MIDDLE" -s zhong-q-1 -n 1
}END_INIT

#start tpo at system outside
BEGIN_INIT{
PROGRAM: /home/proj1/tpo
LEVEL: SYSTEM OUTSIDE
#arguments passed to program to define SOCKS options
ARG: -d 3 -s
}END_INIT

#start netscape at system middle with the tpi as the x-server
BEGIN_INIT{
PROGRAM: netscape
LEVEL: SYSTEM MIDDLE
#Netscape configuration argument
ARG: -display localhost:1
}END_INIT

```

Each process to be spawned by the TBFE has one entry in the TBFE configuration file. In the configuration file listed above, there are entries for TPI 212, TPO 214 and the Web browser 210. Each entry specifies the location of the program file in the CMW machine 200's file system, the sensitivity label to start the program and the parameters (argument vectors, or ARGs) which should be passed to the program. The parameters define the communication channels between the different processes, such as the TCP port number that the TPI 212 should listen to and the X-server that the Web browser 210 should direct the display message to.

The TBFE configuration file includes an entry for TPI 212. The entry specifies the location of the TPI 212 program, assigns to TPI 212 the label "SYSTEM INSIDE", and declares the following parameters: "-1" defines the sensitivity label "SYSTEM MIDDLE" for TPI 212 to interact with; "s" defines the display server 232 "zhong-q-1" to be used; and "-n" defines the proxy number "1" used for communications with the display server 232. In practice, display servers are allocated port numbers running from 6000. Thus, a proxy number of "1" maps to a port number of 6001.

The configuration file also includes an entry for TPO 214. The entry specifies the location of the TPO 214 program, assigns to TPO 214 the label "SYSTEM OUTSIDE", and declares the following parameters: "-d" defines the debug level as "3"; and "-s" sends all the debug information to be displayed on "stderr".

Finally, the configuration file includes an entry for the Web browser 210. The entry specifies the location of the Web browser 210 program, assigns to the Web browser 210 the label "SYSTEM MIDDLE" and declares the parameter: "-display localhost:1", which configures Netscape to send display messages to TPI 212, on proxy server number 1, instead of to the default X-server.

After reading the configuration file successfully, in step 515 the TBFE processes the entries one by one. For each entry in the configuration file, in step 520, the TBFE raises the Chsubjsl privilege, which allows it to adopt the sensitivity label required for the respective child process in step 525. In step 530, the TBFE drops the Chsubjsl privilege, to prevent a spawned process from misusing it. Then, in step 535, TBFE spawns the respective child process. In effect, TBFE changes its own sensitivity label to the required sensitivity label of the child process that it is going to spawn in order that the child process inherits the correct sensitivity label, as specified in the configuration file. Next, the TBFE again raises the Chsubjsl privilege in step 540, reverts to its original sensitivity label in step 545 and, finally drops the Chsubjsl privilege in step 550. This process repeats, in step 555 for all three entries in the configuration file until both proxies and the Web browser 210 have been spawned.

Finally, in step 560, the TBFE waits for one of the child processes that it spawned to terminate (this will usually be the Web browser 210 when the user has finished using it), and then, in step 565, sends exit signals to the other child processes and itself exits in step 570. Thus, TBFE acts as a single point-of-entry to the Web browser 210. Also, the TBFE will terminate the whole group of processes when any single member terminates for any reason.

Other than the Chsubjsl privilege, TBFE also needs Configaudit, Suspendaudit and Writeaudit privileges to enable it to configure, manipulate and write audit records. Audit records may be used as a historical log of events, which can be analysed to trace any unusual activity, potentially resulting from rogue mobile code. Auditing is well known in computer system management practice, and will not thus be described herein in any further detail.

When TPI 212 is started by the TBFE in the SI compartment, TPI 212 makes a system call which allows it to act as a multilevel server. To make the system call, TPI 212 requires the Chsubjsl privilege: TPI 212 raises the Chsubjsl privilege, makes the system call and then lowers the Chsubjsl privilege again. Once acting as a multilevel server, TPI 212 can receive connections on its allocated TCP port from the SM compartment as well as from the SI compartment.

When the TPO 214 is started by the TBFE in the SO compartment, TPO 214 also makes a system call which allows it to act as a multilevel server. To make the system call, as for TPI 212, TPO 214 requires the Chsubjsl privilege: TPO 214 raises the Chsubjsl privilege, makes the system call and then lowers the Chsubjsl privilege again. TPO 214 then waits for connections on its allocated TCP port: which is typically port 1080, the default SOCKS port. The same port number is also defined in the Web browser 210's options to be used by the Web browser 210 as the messaging proxy port number to which all Web requests are sent.

Having started a Web browser 210 on the CMW machine 200, as described above, the user is presented with a standard Web browser 210 screen, which is rendered in an X-window of the X display server 232 on the user machine 230. The display server 232 facilitates all keyboard or mouse interaction by the user with the window by sending events to the Web browser 210 on the CMW machine 200. The Web browser 210 responds with requests, which control the display server 232, for example to update the X-window display. For ease of understanding only, both X events and X requests will be referred to as X-messages. Typically, the initial display is that of the user's 'home page'.

Figure 6:
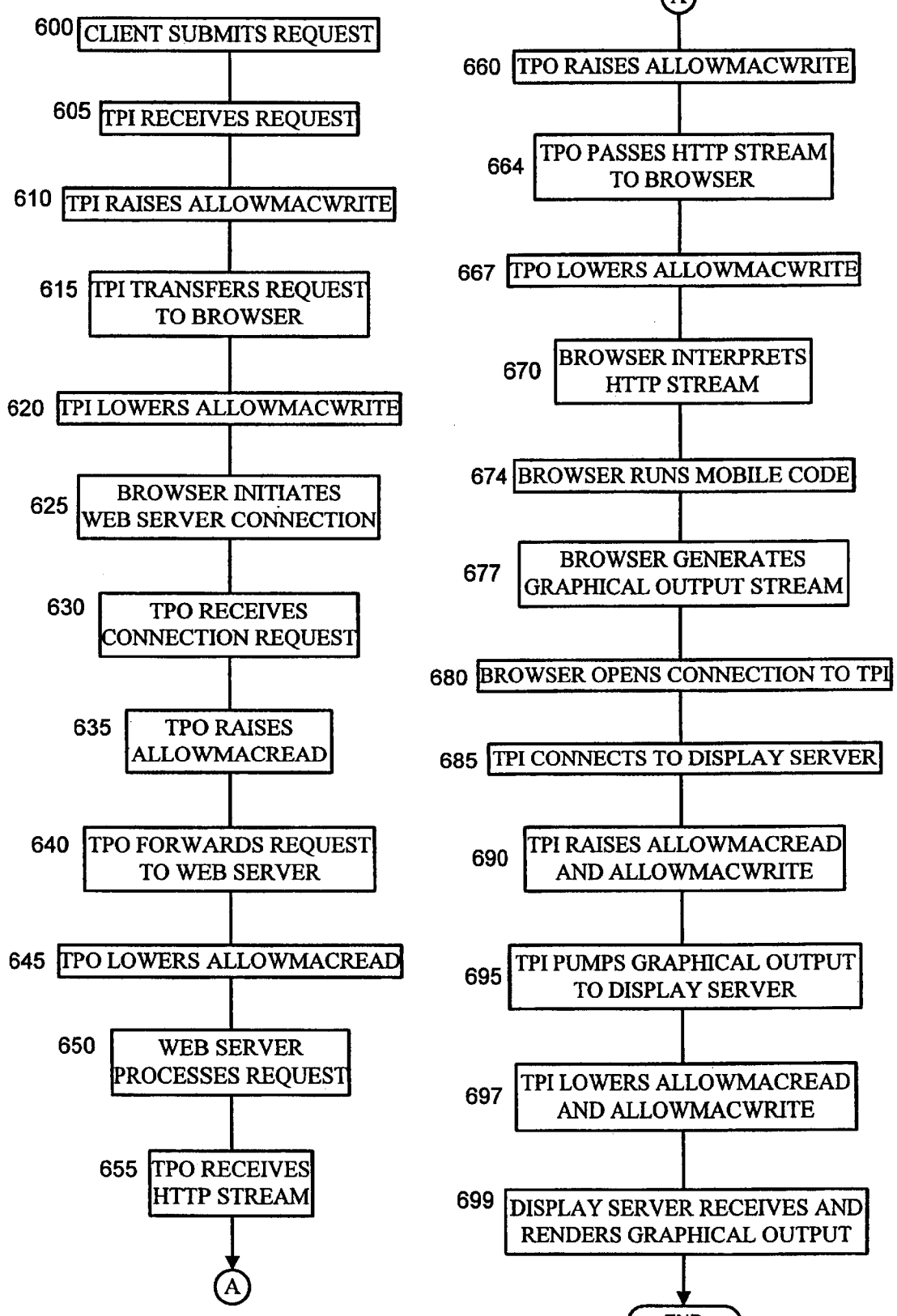
FIG. 6 is a flow diagram, which illustrates the steps involved for the purposes of the present embodiment when a client requests a Web page including mobile code.

The sequence of steps that occur when a user requests a Web page from a Web server 252 will now be described with reference to the flow diagram in FIG. 6.

In step 600, the user submits a request for a specific Web page, or other resource. The request can be a result of the user selecting a hyperlink or typing in the respective URL (universal resource locator). The request is received by TPI 212 in step 605. In step 610, TPI 212 raises the Allowmacwrite privilege, to allow TPI 212 to override the MAC's read/write restrictions, in order to transfer the request from the display server 232 (attached to the SI compartment) to the Web browser 210 (in the SM compartment) in step 615. When the transfer is complete, in step 620, TPI 212 lowers the Allowmacwrite privilege again.

In step 625, the Web browser 210 receives the request and attempts to initiate a connection with the appropriate remote Web server 252, which holds the required Web page. TPO 214 receives the connection request from the Web browser 210 in step 630 and raises the Allowmacread privilege, in step 635, in order to facilitate data transfer from the Web browser 210 (in the SM compartment) to the external network (attached to the SO compartment). Then, in step 640, TPO 214 forwards the connection request to the external network. TPO 214 also acts to filter the request to block communications with prohibited external sites. After transmission is complete, in step 645, TPO 214 lowers the Allowmacread privilege again.

The processes that occur once the request reaches the Internet are well known in the present art and will not therefore be described herein in detail. In brief, however, in step 650, the Web server 252 receives the request and responds by returning the Web page and associated mobile code to the CMW machine 200. In practice, one Web page typically references, and is rendered from, multiple data sources (commonly containing data such as formatted text and graphics images), which are down-loaded onto a Web browser using multiple HTTP requests. In the present case, where the Web page includes mobile code, there will be a reference to at least one embedded process, for example a Java applet, which is down-loaded to the Web browser in the form of byte codes.

In step 655, TPO 214 receives the stream of HTTP from the Web server 252. TPO 214 again filters the stream at this stage to block undesirable messages. Then, in step 660, TPO 214 raises the Allowmacwrite privilege and passes the HTTP stream from the SO compartment to the Web browser 210 in the SM compartment in step 664. Then, in step 667, TPO 214 lowers the Allowmacwrite privilege.

The Web browser 210 receives the stream and interprets the content as a Web page with embedded mobile code, in step 670. The Web browser 210, which is configured to allow mobile code to execute, then loads the mobile code into memory and executes it in step 674. As a result of executing the mobile code, the Web browser 210 generates a graphical output, in step 677, and requests a connection, in step 680, to pass the output X-messages to the display server 232.

When the Web browser 210 requests a connection from the SM compartment, TPI 212 accepts the request, evaluates it and tries to make a connection to the remote display server 232 in step 685. The identity and location of the remote display server 232 that the user is using is passed to TPI 212 as a parameter in the configuration file, as described above. On successfully connecting to the display server 232, TPI 212 raises the Allowmacread and Allowmacwrite privileges in step 690 and, having established a connection, pumps the messages between the SM and the SI compartments in step 695 to the display server 232. Optionally, some X-message filtering can also be performed here to prevent suspicious X-messages, potentially generated by the mobile code, from getting through.

Then, TPI 212 lowers the Allowmacread and Allowmacwrite privileges in step 697 and, finally, in step 699, the display server 232 receives the X-messages and renders the X-window appropriately.

The users of the internal network 220, who can only connect to the SI compartment, cannot bypass the security administration by directly starting their own Web browser. This is because Web browsers started by internal users cannot gain access to the TPO 214, as a result of TPO 214 accepting connections-only from the SM and SO compartments. Web browsers 210 started by internal users directly can therefore interact only with the internal network 220.

It is emphasised that the embodiment described above defines only one specific way of working the present invention, which conveniently takes advantage of HP's CMW operating system. Clearly, other CMW-compliant operating systems, such as SUN Microsystems' Trusted Solaris operating system, could be readily configured to implement the invention. Indeed, embodiments of the invention could be implemented in any operating system, including operating systems implementing DAC, by configuring the operating system to provide appropriate functionality. Of course, far greater care would be needed in configuring non-MAC systems. Additionally, the TPI, used to pass data between the browser and the inside network, could be implemented in many ways other than has been described herein to provide the sufficient level of security required. However, provided with the foregoing description, the skilled computer programmer would be in a position to implement the invention in many different ways by using the concepts embodied herein, without departing from the essence of the invention. The present invention should, therefore, be read broadly to encompass any system that applies the general teachings that are disclosed herein.

It will be appreciated that the invention is particularly suited to increasing security in scenarios where transactional clients are down-loaded as mobile code for interaction with other clients or servers in a client-server environment. Such an environment can be one that complies with the CORBA (Common Object Request Broker Architecture) or DCOM models.

References

[NCSC]: National Computer Security Centre, "Department of Defence Trusted Computer System Evaluation Criteria", DoD Standard 5200.28-STD, 1985

[DIA 91]: "Compartmented Mode Workstation Evaluation Criteria VERSION 1 (Final)", J. P. L. Woodward, DDS-2600-6243-91, 1991.

[X Window]: "X Window System", Scheifler, Robert and James Gettys, Digital Press, 1992

[SOCKS]: "SOCKS Protocol Version 5", M. Leech, M. Ganis, Y. Lee, etc., RFC 1928, March 1996

CMW machine 200 Manuals:
- HP-UX Trusted OS Installation Manual
- HP-UX Trusted OS Read Me First/Release Notes
- HP-UX 10.09.01 CMW machine 200 Trusted Facilities Manual
- HP-UX 10.09.01 CMW machine 200 Key Security Concepts
- HP-UX 10.09.01 CMW machine 200 Support Media User's Guide
- HP-UX 10.09.01 CMW machine 200 Trusted Facility Admin Ref. Manual
- HP-UX 10.09.01 CMW machine 200 MaxSix Administrator's Guide
- HP-UX 10.09.01 CMW machine 200 Security Features User's Guide
- HP-UX 10.09.01 CMW machine 200 Security Features Programmer's Guide

What is claimed is:

1. A browser system, comprising:
a browser process configured to receive from a remote data source a resource incorporating mobile code and to process the mobile code securely to generate graphical output data; and
a first interface process configured to provide a communications channel between the browser process and a remote display system to facilitate transfer of the graphical output data to the remote display system and protect the remote display system from potentially damaging effects of processing the mobile code.

2. A browser system according to claim 1, comprising an operating system which associates processes or objects within an operating environment of the operating system with one of a number of sensitivity labels, wherein the browser process has a first sensitivity label and data associated with the remote display system has a second sensitivity label.

3. A browser system according to claim 1, wherein the first interface process has a first privilege which allows it to transfer data from the browser process to the remote display system.

4. A browser system according to claim 3, wherein the first interface process is configured to raise the first privilege when data transfer is required and lower the first privilege after data transfer is completed.

5. A browser system according to claim 2, further comprising a second interface process, which provides a communications channel between the browser process and the remote data source to facilitate transfer of data from the remote data source to the browser process.

6. A browser system according to claim 5, wherein data associated with the remote data source has a third sensitivity label.

7. A browser system according to claim 5, wherein the second interface process has a second privilege which allows it to transfer data from the remote data source to the browser process.

8. A browser system according to claim 7, wherein the second interface process is configured to raise the second privilege when data transfer is required and lower the second privilege after data transfer is completed.

9. A browser system according to claim 2, wherein the first interface process is configured as a multilevel process whereby it can receive connection requests having either the first sensitivity label or the second sensitivity label.

10. A browser system according to claim 6, wherein the second interface process is configured as a multilevel process whereby it can receive connection requests having either the second sensitivity label or the third sensitivity label.

11. A browser system according to claim 2, wherein the operating system enforces Mandatory Access Control.

12. A browser system configured for operation in an operating system enforcing Mandatory Access Control, the browser system comprising:
a browser process having a first sensitivity label;
a first interface process having privileges that allow it to transfer data between the browser process and a display system, the operating system being configured to allocate data associated with the display system with a second sensitivity label, the first interface process being configured to protect the display system from potentially damaging effects of the browser process processing the mobile code; and
a second interface process having privileges that allow it to transfer data between the browser process and a remote data source, the operating system being configured to allocate data associated with the remote data source with a third sensitivity label, the browser process being configured to:
receive via the second interface process a resource including mobile code;
process the mobile code to provide graphical output data; and
send the graphical output data via the first interface process to the display server.

13. A browser system according to claim 12, wherein the browser process is further configured to receive a request, via the first interface process, from the display server for a remote resource including mobile code and to transfer a respective request for the resource, via the second interface process, to the remote data source.

14. A method of securely accessing a resource including mobile code using a browser system configured for operation in an operating system enforcing mandatory access control, the method including a browser process having a first sensitivity label enacting the steps of:
receiving, via an second interface process, a resource including mobile code from a remote data source, the operating system being configured to allocate data associated with the remote data source with a third sensitivity label and the second interface process having privileges that allow it to transfer data between the browser and the remote data source;
processing the mobile code to provide graphical output data; and
sending the graphical output data via an first interface process to a display server, the operating system being configured to allocate data associated with the remote display system with a second sensitivity label and the first interface process having privileges that allow it to transfer data between the browser process and the display system.

15. A method of operating a browser system, comprising:
receiving from a remote data source a resource incorporating mobile code and processing the mobile code securely to generate graphical output data; and
providing a communications channel between the browser process and a remote display system to facilitate transfer of the graphical output data to the remote display system and protect the display system from potentially damaging effects of processing the mobile code.

16. Apparatus configured for operating a browser system in an encapsulated processing environment, the browser system comprising:
- a first interface for receiving from a remote data source, into the encapsulated processing environment, a resource including mobile code;
- a processor for processing the mobile code securely and producing a graphical output representative of the result of processing the mobile code; and
- a second interface for passing only the graphical output from the encapsulated processing environment to a remote display system.

17. A compartmented browser system comprising:
- first and second compartments;
- a browser process operating in the first compartment and configured to receive from a remote data source a resource incorporating mobile code and to process the mobile code in the first compartment to generate graphical output data;
- a display system in or associated with the second compartment; and
- an interface process configured to provide a communications channel between the first compartment and the second compartment to facilitate transfer of the graphical output data from the first compartment to the display system and protect the display system from potentially damaging effects of processing the mobile code.

18. A compartmented browser system according to claim 17, which associates processes or objects within compartments with a respective one of a number of sensitivity labels, wherein the browser process has a first sensitivity label associated with the first compartment and data associated with the display system has a second sensitivity label associated with the second compartment, the compartmented browser system further comprising a third compartment, the remote data source being associated with the third compartment, and an second interface process configured to provide a communications channel between the first compartment and the third compartment to facilitate transfer of data from the remote data source to the browser process.

19. A method of operating a browser system, comprising:
- receiving into a first compartment from a remote data source a resource incorporating mobile code and processing the mobile code in the first compartment to generate graphical output data; and
- providing a communications channel between the first compartment and a remote display system in or associated with a second compartment to facilitate transfer of the graphical output data to the remote display system and protect the display system from potentially damaging effects of processing the mobile code.

20. A compartmented browser system comprising a plurality of logically distinct compartments, wherein access by processes or transfer of data between compartments is controlled by a mandatory access control scheme, the compartmented browser system comprising:
- a browser process operating in a first compartment, wherein data associated with the browser process, or generated by the browser process, is associated by the compartmented browser system with a first sensitivity label;
- a display system in or associated with a second compartment, wherein data asxsociated with the display system, or generated by the display system, is associated by the compartmented browser system with a second sensitivity label; and
- a trusted interface process arranged to transport data between the first and second compartments, wherein
  - the browser process is arranged to receive from a remote data source a resource incorporating mobile code, process the mobile code in the first compartment to generate data including graphical output data, said data being associated by the compartmented browser system with the first sensitivity label, and send a connection requst to the trusted interface process to send the graphical output data to the display system;
  - the trusted interface process is arranged to receive the connection request from the browser process, inspect the connection request in order to establish that the request is authorized, invoke a privilege which allows the trusted interface process to receive the graphical output data and transport it to the display system, and thereafter withdraw the privilege the prevent further transport of data between the first and second compartments; and
  - the display process is arranged to receive the graphical output data and render it on a graphical display device and protect the display system from potentially damaging effects of processing the mobile code.

21. A browser system according to claim 1, wherein the browser system is protected from being damaged by the mobile code by the interface process.

\* \* \* \* \*

UNITED STATES PATENT AND TRADEMARK OFFICE
CERTIFICATE OF CORRECTION

PATENT NO. : 6,490,626 B1
DATED : December 3, 2002
INVENTOR(S) : Nigel Edwards et al.

It is certified that error appears in the above-identified patent and that said Letters Patent is hereby corrected as shown below:

Column 16,
Line 30, change "requst" to -- request --
Line 39, change "the privilege the" to -- the privilege to --

Signed and Sealed this

Twenty-sixth Day of July, 2005

JON W. DUDAS
*Director of the United States Patent and Trademark Office*